US010003283B2

United States Patent
Grossmann et al.

(10) Patent No.: US 10,003,283 B2
(45) Date of Patent: Jun. 19, 2018

(54) METHOD FOR CHANGING AN OPERATING STATE OF AN ELECTRIC MACHINE AND DEVICE FOR CHANGING THE OPERATING STATE OF AN ELECTRIC MACHINE

(71) Applicant: Robert Bosch GmbH, Stuttgart (DE)

(72) Inventors: Ekard Grossmann, Stuttgart (DE); Daniel Raichle, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/309,045

(22) PCT Filed: Mar. 9, 2015

(86) PCT No.: PCT/EP2015/054826
§ 371 (c)(1),
(2) Date: Nov. 4, 2016

(87) PCT Pub. No.: WO2015/169479
PCT Pub. Date: Nov. 12, 2015

(65) Prior Publication Data
US 2017/0077843 A1    Mar. 16, 2017

(30) Foreign Application Priority Data
May 9, 2014   (DE) .................. 10 2014 208 747

(51) Int. Cl.
*H02P 6/14*      (2016.01)
*H02P 27/06*    (2006.01)
(Continued)

(52) U.S. Cl.
CPC .............. *H02P 3/22* (2013.01); *B60L 3/0061* (2013.01); *B60L 11/1803* (2013.01);
(Continued)

(58) Field of Classification Search
CPC ....... H02M 2001/0009; H02M 7/5387; H02M 1/32; H02M 2001/008; H02M 5/271;
(Continued)

(56) References Cited

U.S. PATENT DOCUMENTS 5,703,457 A * 12/1997 Davis ...................... H02K 3/28
                                                              318/400.34
5,874,818 A *  2/1999 Schuurman ....... H02M 7/53873
                                                                  318/280
(Continued)

FOREIGN PATENT DOCUMENTS

DE     102011081173     2/2013
DE     102012216008     3/2014
(Continued)

OTHER PUBLICATIONS

International Search Report for Application No. PCT/EP2015/054826 dated Jun. 9, 2015 (English Translation, 2 pages).

*Primary Examiner* — Bentsu Ro
(74) *Attorney, Agent, or Firm* — Michael Best & Friedrich LLP (57) ABSTRACT

The present invention provides a device and a method for changing the operating state of an electric machine to the free-wheeling mode, in which significant excessive increases in voltage can be avoided. In the freewheeling mode, the individual phase connections of an electric machine are disconnected electrically from one another in order to change the electric machine into a safe operating state. According to the invention, only some of the phase currents of the electric machine are evaluated. On the basis of the evaluated phase currents, suitable times for the disconnection of all the phase connections are determined, that is to say even for the phases in which no evaluation of the phase currents takes place.

12 Claims, 2 Drawing Sheets

(51) Int. Cl.
  *H02P 3/22*   (2006.01)
  *B60L 3/00*   (2006.01)
  *B60L 11/18*  (2006.01)
  *H02P 29/02*  (2016.01)
  *H02M 1/32*   (2007.01)
  *H02P 6/08*   (2016.01)
  *H02M 1/00*       (2006.01)

(52) U.S. Cl.
  CPC .............. *H02M 1/32* (2013.01); *H02P 6/085* (2013.01); *H02P 27/06* (2013.01); *H02P 29/02* (2013.01); *H02M 2001/0009* (2013.01); *Y02T 10/642* (2013.01); *Y02T 10/7005* (2013.01)

(58) Field of Classification Search
  CPC .... H02M 7/003; H02M 7/53875; H02M 1/36; H02M 2001/322; H02M 7/53873; H02M 7/5395; H02P 27/06; H02P 6/14; H02P 6/182
  See application file for complete search history.

(56) References Cited

U.S. PATENT DOCUMENTS

| | | | | |
|---|---|---|---|---|
| 6,603,647 | B2 * | 8/2003 | Briesen | H02M 5/271 361/91.1 |
| 7,285,930 | B2 * | 10/2007 | Weinmann | H02P 6/182 318/400.31 |
| 7,327,181 | B2 * | 2/2008 | Hussein | H02M 7/53875 327/296 |
| 8,513,907 | B2 * | 8/2013 | Kondo | H02P 6/14 318/400.27 |
| 8,693,226 | B2 * | 4/2014 | Kitabatake | H02M 7/5387 363/127 |
| 2003/0112640 | A1 * | 6/2003 | Briesen | H02M 5/271 363/13 |
| 2006/0250728 | A1 * | 11/2006 | Hussein | H02M 7/53875 361/18 |
| 2007/0194734 | A1 * | 8/2007 | Weinmann | H02P 6/182 318/400.31 |
| 2011/0006710 | A1 * | 1/2011 | Kondo | H02P 6/14 318/400.03 |
| 2011/0309874 | A1 * | 12/2011 | Takimoto | H03K 17/0814 327/427 |
| 2013/0021831 | A1 * | 1/2013 | Kitabatake | H02M 7/5387 363/131 |
| 2013/0321037 | A1 * | 12/2013 | Eberlein | G05F 1/10 327/109 |
| 2014/0191700 | A1 | 7/2014 | Eberlein et al. | |
| 2014/0333246 | A1 * | 11/2014 | Eberlein | B60L 3/04 318/400.27 |

FOREIGN PATENT DOCUMENTS

| | | |
|---|---|---|
| EP | 1816739 | 8/2007 |
| JP | 2000134955 | 5/2000 |

* cited by examiner

METHOD FOR CHANGING AN OPERATING STATE OF AN ELECTRIC MACHINE AND DEVICE FOR CHANGING THE OPERATING STATE OF AN ELECTRIC MACHINE

BACKGROUND OF THE INVENTION

The present invention relates to a method for changing an operating state of an electric machine and a device for changing the operating state of an electric machine to a free-wheeling mode.

Electric machines, such as, for example, permanently excited synchronous machines, are used in numerous technical areas. Such permanently excited synchronous machines are, for example, used in motor vehicles. For safety reasons, provisions must be taken for a safe operating state in the event of a fault. An option for a safe operating state is, for example, the so-called active short-circuit. In this case, the connections of the electric machine are short-circuited by means of suitable switching elements. A further safe operating state is the so-called freewheel. In the free-wheeling mode, all of the connections of the electric machine are disconnected from one another, and an active actuation of the electric machine with voltage does not take place.

The German patent application DE 10 2011 081 173 A1 discloses a device and a method for setting operating states of an inverter which actuates an electric machine. In this case, the electric machine can be switched by means of the inverter to a freewheeling mode or to an active short circuit depending on the rotational speed of said electric machine.

During the active short circuit, relatively high currents can flow through the switching elements which connect the individual phase connections of the electric machine to one another. If the electric machine is now to be changed from the active short circuit to the freewheeling mode, the switching elements between the individual phase connections of the electric machine are then preferably opened if no or only a low amount of current flows through the respective switching elements. To this end, the currents have to be monitored which flow through the respective switching elements.

There is therefore a need for a method and a device for a simple and cost effective change of the operating state of an electric machine to the freewheeling mode.

SUMMARY OF THE INVENTION

In order to meet this need, the present invention provides, according to one aspect, a device for changing an operating state of an electric machine comprising at least three phase connections to a freewheeling mode, comprising the following steps: providing a first switching element comprising a first freewheeling diode between a first phase connection of the electric machine and a node; providing a second switching element comprising a second freewheeling diode between a second phase connection of the electric machine and the node; providing a third switching element comprising a third freewheeling diode between a third phase connection of the electric machine and the node; monitoring a first electrical current through the first freewheeling diode; monitoring a second electrical current through the second freewheeling diode; receiving a request for changing the operating state of the electric machine to the freewheeling mode; and opening the third switching element as a function of the monitored first electrical current through the first freewheeling diode and the monitored second electrical current through the second freewheeling diode if a request for changing the operating state of the electric machine to the freewheeling mode has been received.

According to a further aspect, the present invention provides a device for changing an operating state of an electric machine comprising at least three phase connections to a freewheeling mode. The device comprises a first switching element, which is designed to electrically connect a first phase connection of the electric machine to a node, a second switching element, which is designed to electrically connect a second phase connection of the electric machine to the node, a third switching element, which is designed to electrically connect a third phase connection of the electric machine to the node, a first current detector, which is designed to monitor a first electrical current through the first freewheeling diode, a second current detector, which is designed to monitor a second electrical current through the freewheeling diode, and an actuating device, which is designed to receive a request for changing the operating state of the electric machine to the freewheeling mode and to emit a control signal for opening the third switching element, wherein the control signal for opening the third switching element is emitted as a function of the first electrical current monitored through the first current detector and the second electrical current monitored through the second current detector.

A concept underlying the present invention consists of evaluating only some of the phase currents of an electric machine if the operating state of this electric machine is, for example, to be changed from an active actuation or an active short circuit to the freewheeling mode. The switching element of the at least one remaining phase of the electric machine, in which there is no monitoring of the phase current, is actuated on the basis of a logical linking of the monitored phase currents. In this way, the operating mode of an electric machine can be transferred to the freewheeling mode without all of the phase currents having to be monitored in the process.

Thus, a current detection can be eliminated in at least one phase of the electric machine. In comparison to the existing solutions, this makes a simplified and even more cost effective solution possible for a changeover of the operating state of an electric machine to the freewheeling mode.

Because, in this way, it is possible for all phases of the electric machine to open the respective switching elements in which no electrical current or only a small amount of electric current currently flows through the respective switching elements, no or only small excess voltages occur during the respective switching processes when changing to the freewheeling mode.

The change to the freewheeling mode of an electric machine can thus be cost effectively implemented with little expense for components and without having to worry about faults or damage to the components.

According to one embodiment, the step for opening the third switching element then opens the third switching element if a request for changing the operating state of the electric machine to the freewheeling mode has been received and, in the steps for monitoring the first electrical current and for monitoring the second electrical current, no electrical current is detected through the first freewheeling diode and the second freewheeling diode. In this way, a suitable point in time for opening the third switching element can be determined without the electrical current having to be monitored in the current path of the third phase connection of the electric machine.

According to one embodiment, the method comprises a step for opening the first switching element if the third switching element is open and the step for monitoring the first electrical current in the first freewheeling diode detects an electrical current through the first freewheeling diode. The method furthermore comprises a step for opening the second switching element if the third switching element is open and the step for monitoring the second electrical current through the second freewheeling diode detects an electrical current through the second freewheeling diode. In this way, even the two remaining switching elements can be opened at a suitable point in time after the opening of the third switching element.

According to one embodiment, the method comprises a step for opening the first switching element if a request for changing to the freewheeling mode has been received and the step for monitoring the first electrical current through the first freewheeling diode detects a current through the first freewheeling diode. The method further comprises a step for opening the second switching element if a request for changing the operating state of the electric machine to the freewheeling mode has been received and the step for monitoring the second electrical current through the second freewheeling diode detects a current through the second freewheeling diode. The step for opening the third switching element opens the third switching element if a request for changing the operating state of the electric machine to the freewheeling mode has been received and the first switching element as well as the second switching element is already open for a predetermined length of time. The predetermined length of time can depend on the current rotational speed of the electric machine. In a preferable manner, the method can therefore furthermore comprise a step for determining the current rotational speed of the electric machine, wherein the predetermined length of time is determined as a function of the acquired rotational speed of the electric machine.

According to a further embodiment, the method comprises a step for opening the first electric switching element if a request for changing the operating state of the electric machine to the freewheeling mode has been received and the step for monitoring the first electrical current through the first freewheeling diode detects that the current through the first freewheeling diode drops below a predetermined limit value. The method further comprises a step for opening the second switching element if a request for changing the operating state of the electric machine to the freewheeling mode has been received and the step for monitoring the second electrical current through the second freewheeling diode detects that the current through the second freewheeling diode drops below the predetermined limit value. The step for opening the third switching element opens the third switching element if a request for changing the operating state of the electric machine to the freewheeling mode has been received and the first switching element as well as the second switching element is open. The predetermined limit value is thereby preferably very small, in particular approaching zero. In this way, the first switching element as well as the second switching element is then open if the electrical current through the first freewheeling diode or respectively the electrical current through the second freewheeling diode drops due to the periodicity of the phase currents and thus has a value around the zero-crossing. The point in time for the opening of the third switching element, the current of which is not monitored, results from a logic AND-operation of the actuation for the switching elements in the phases in which the phase currents are monitored.

According to a further embodiment, the method comprises a step for determining a direction of rotation of the electric machine, wherein the first switching element and the second switching element are in each case associated with one of the phases of the electric machine on the basis of the determined direction of rotation. The step for opening the third switching element then opens the third switching element if a request for changing the operating state of the electric machine to the freewheeling mode has been received and the step for monitoring the first electrical current through the first freewheeling diode detects that the current through the first freewheeling diode drops below a predetermined limit value. The method further comprises a step for opening the first switching element if a request for changing the operating state of the electric machine to the freewheeling mode has been received and the step for monitoring the second electrical current through the second freewheeling diode detects that the current through the second freewheeling diode falls below a predetermined limit value. In addition, the method comprises a step for opening the second switching element if a request for changing the operating state of the electric machine to the freewheeling mode has been received and the first switching element as well as the third switching element is open. In this way, a change of the operating state of the electric machine to the freewheeling mode at a suitable point in time, at which not all of the phase currents have to be monitored, is likewise possible.

According to a further embodiment, the method comprises a step for determining a direction of rotation of an electric motor and for associating the first and the second switching element with the respective phase connections as a function of the determined direction of rotation, a step for opening the second switching element and the third switching element if a request for changing the operating state of the electric motor to the freewheeling mode has been received and the step for monitoring the second electrical current through the second freewheeling diode detects that the current through the second freewheeling diode drops below a predetermined limit value, and a step for opening the first switching element if a request for changing the operating state of the electric motor to the freewheeling mode has been received and the step for monitoring the first electrical current through the first freewheeling diode detects that the current is flowing through said first freewheeling diode.

According to one embodiment, the step for determining the direction of rotation determines said direction of rotation using the monitored first electrical current through the first freewheeling diode and the monitored second electrical current through the freewheeling diode. In this way, a particularly efficient determination of the direction of rotation of the electric machine is possible.

According to one embodiment, the method comprises a step for determining the rotational speed of the electric machine, wherein the first switching element, the second switching element and the third switching element are opened at the same time if the rotational speed undershoots a predetermined threshold value. As long as the electric machine has only a relatively low rotational speed and thus rotates only very slowly, only relatively low currents flow in the respective phases of the electric machine. If such low electrical currents are interrupted, only relatively low overvoltages occur which are not dangerous for the corresponding switching elements and for the further components of an electric drive. At rotational speeds below a predetermined threshold value, all of the switching elements can therefore also be immediately opened at the same time in order to change to the freewheeling mode of the electric machine.

According to one embodiment, the step for monitoring the first electrical current through the first freewheeling diode determines whether a current is or is not flowing through the first freewheeling diode; and the step for monitoring the second electrical current through the second freewheeling diode determines whether a current is or is not flowing through the second freewheeling diode. This binary information, whether a current is or is not flowing through the respective freewheeling diode, is sufficient for the inventive change of the operating state to the freewheeling mode. If other items of information about the current flow through the freewheeling diodes are available, these items can also, of course, be included.

According to a further aspect, the present invention relates to a current converter, in particular an inverter comprising an inventive device for changing the operating state of the electric machine to the freewheeling mode.

According to a further aspect, the present invention relates to an electrically driven motor vehicle comprising an inventive device for changing the operating state of an electric machine.

BRIEF DESCRIPTION OF THE DRAWINGS

Further embodiments and advantages of the present invention ensue from the following description with reference to the attached drawings. In the drawings.

DETAILED DESCRIPTION

In the figures, identical or identically operating functions or functional features and components are provided in each case with the same reference signs, provided that it is not indicated otherwise. It goes without saying that components and elements in the drawings are not necessarily reproduced true to scale for reasons of clarity.

Further possible configurations and modifications and implications of the invention also do not explicitly comprise stated combinations of features of the invention that have been previously described or are described below.

Figure 1:
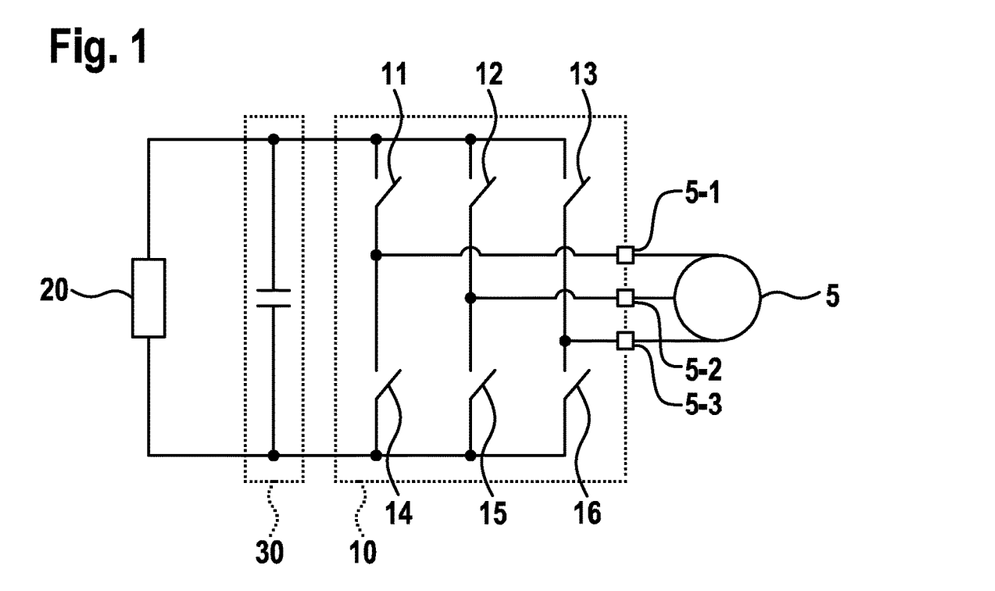
FIG. 1 shows a schematic depiction of a current converter arrangement for operating an electric machine.

FIG. 1 shows a schematic depiction of a current converter arrangement for operating an electric machine 5. The current converter arrangement comprises an energy source 20, such as, for example, a traction battery of an electrically driven motor vehicle, a DC voltage intermediate circuit (DC link) 30 and a current converter 10. The electric machine 5 can, for example, be a synchronous motor or respectively a synchronous machine.

The DC voltage intermediate circuit 30 can be arranged in parallel with the outputs of the electric energy source 20. A current converter 10, for example a pulse-controlled converter circuit, can be connected to the output connections of the DC voltage intermediated circuit 30. The current converter 10 is designed as a full bridge circuit or B6 bridge. For this purpose, the current converter circuit 10 comprises upper half-bridge branches comprising the switching elements 11, 12, 13 and lower half-bridge branches comprising the switching elements 14, 15, 16. The switching elements 11-16 can, for example, comprise power semiconductor switches. The switching elements 11-16 can, for example, particularly comprise field effect transistors, such as MOSFETs or bipolar transistors having an insulated gate (IGBT).

By means of a suitable actuation of the switching elements 11-16, the current converter 10 can generate a three-phase AC voltage for actuating the electric machine 5. To this end, a corresponding phase voltage is generated by the current converter respectively at the phase connections 5-1, 5-2 and 5-3 of the electric machine.

During the normal controlled operation, an electrical three-phase voltage can be provided in this manner at the electric machine 5. Furthermore, the safe operating state of an active short circuit can, for example, be set by closing the upper three switching elements 11-13 or respectively by closing the lower three switching elements 14-16 at the electric machine 5. In addition, a further safer operating state in the form of a freewheeling mode is also possible, in which no voltage is applied to the phase connections 5-1 to 5-3 of the electric machine 5 and furthermore in which the phase connections 5-1 to 5-3 of the electric machine are insulated from one another. In this case, all six switching elements 11-16 are open.

Figure 2:
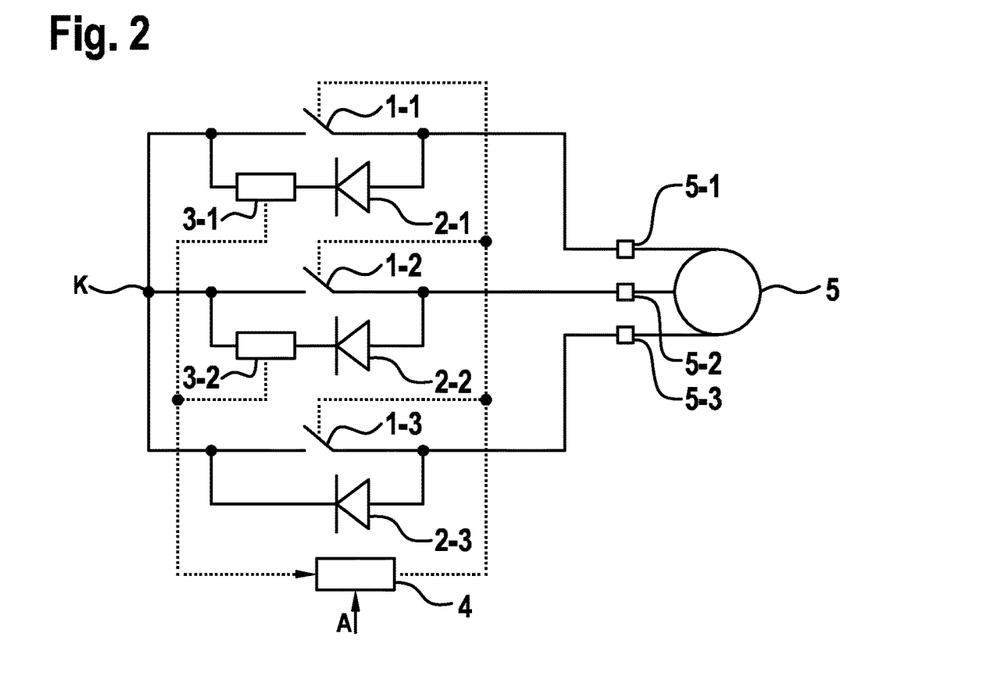
FIG. 2 shows a schematic depiction of a device for changing the operating state of an electric machine according to one exemplary embodiment.

FIG. 2 shows a schematic depiction of a device for changing the operating state of an electric machine 5, as said device underlies an embodiment of the present invention. The electric machine 5 has in this case, for example, three phase connections 5-1, 5-2 and 5-3. The first phase connection 5-1 is connected to the node K via a first switching element 1-1. A first freewheeling diode 2-1 is arranged in parallel with the first switching element 1-1. The second phase connection 5-2 is likewise connected to the node K via a second switching element 1-2. A second freewheeling diode 2-2 is arranged in parallel with the second switching element 1-2. The third phase connection 5-3 is connected to the node K via a third switching element 1-3. A third freewheeling diode 2-3 is arranged in parallel with the third switching element 1-3. The three switching elements 1-1 to 1-3 can, for example, relate to the upper three switching elements 11-13 of the current converter 10 from FIG. 1. The three switching elements 1-1 to 1-3 can likewise relate to the lower three switching elements 14-16 of the current converter 10 from FIG. 1.

A first current detector 3-1 is disposed in the current path of the first freewheeling diode 2-1 and monitors the electrical current through the first freewheeling diode 2-1. A second current detector 3-2 is likewise disposed in the current path of the second freewheeling diode 2-2. This second current detector 3-2 monitors the electrical current through the second freewheeling diode 2-2. The first current detector 3-1 and the second current detector 3-2 can furthermore be connected to an actuating device 4. This actuating device 4 can furthermore have an input which is designed to receive a request A for changing the operating state of the electric machine 5 to a freewheeling mode.

After the actuating device 4 has received a request A for a change of the electric machine 5 to the freewheeling mode, the actuating device 4 evaluates the electrical currents in the first freewheeling diode 2-1 and the second freewheeling diode 2-2 that are monitored by the first current detector 3-1 and the second current detector 3-2. On the basis of this evaluation of the detected currents through the first freewheeling diode 2-1 and the second freewheeling diode 2-2, the actuating device 4 then generates in each case a control signal for opening the first switching element 1-1, the second switching element 1-2 and the third switching element 1-3. The control signal for opening the third switching element 1-3 is emitted as a function of the electrical current through the first freewheeling diode 2-1 detected by the first current detector 3-1 and the electrical current through the second freewheeling diode 2-2 detected by the second current detector 3-2. After all three switching elements 1-1 to 1-3 have been opened on the basis of the control signals emitted by the actuating device 4, the electric machine 5 is located in the safe operating state of the freewheeling mode.

Figure 3:
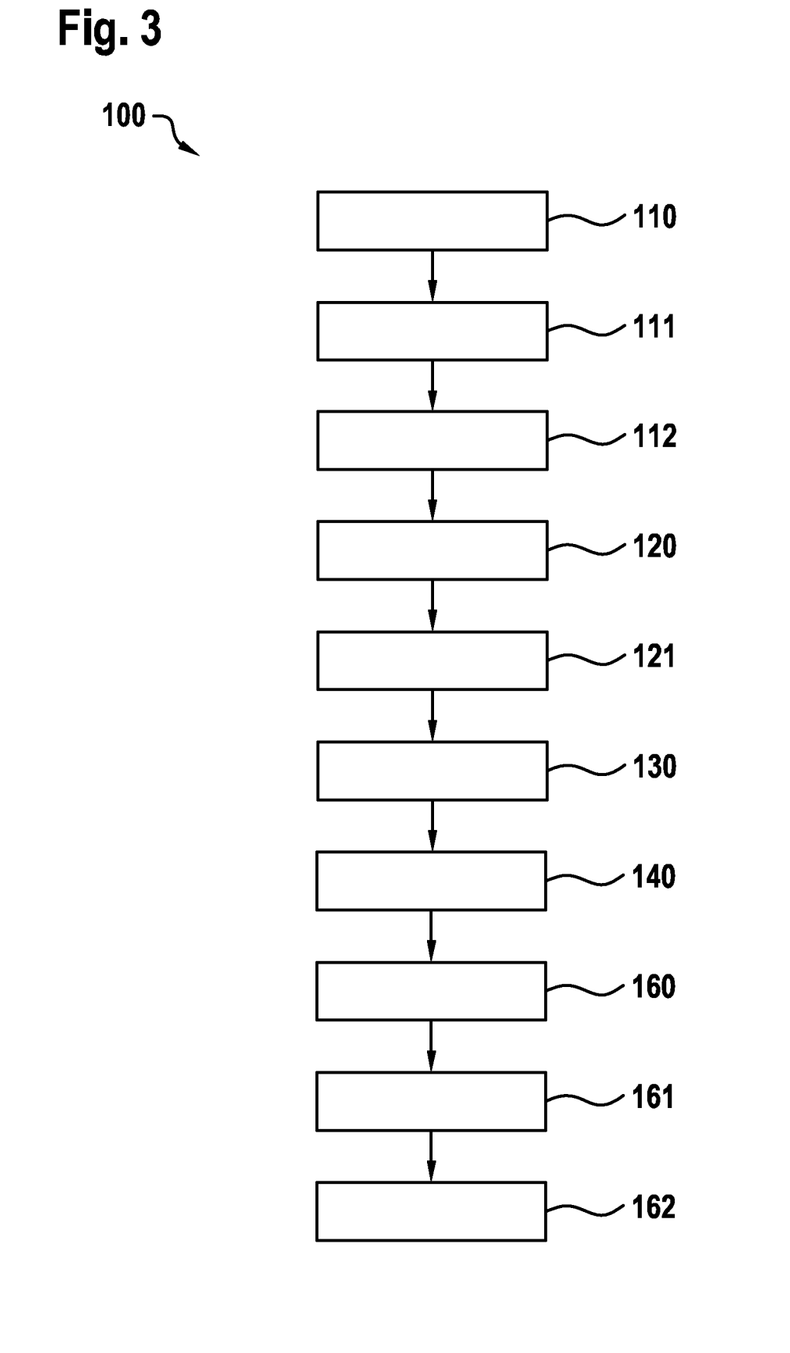
FIG. 3 shows a schematic depiction of a flow diagram for a method as said method underlies one exemplary embodiment of the present invention.

FIG. 3 shows a schematic depiction of a flow diagram for a method for changing the operating state of an electric machine 5 to the freewheeling mode as said method underlies one embodiment of the present invention. The method 100 for changing an operating state of an electric machine 5 to a freewheeling mode initially in a first step 110 provides a first switching element 1-1 comprising a first freewheeling diode 2-1 between a first phase connection 5-1 of the electric machine 5 and a node K. In a further step 111, a second switching element 1-2 comprising a second freewheeling diode 2-2 is provided between a second phase connection 5-2 of the electric machine 5 and the node K. In step 112, a third switching element 1-3 comprising a third freewheeling diode 2-3 is furthermore provided between a third phase connection 5-3 of the electric machine 5 and the node K.

In step 120, a first electrical current through the first freewheeling diode 2-1 can thereupon be monitored. The monitoring of the first electrical current through the first freewheeling diode 2-1 can, for example, take place by means of a first current detector 3-1. It is sufficient for the method 100 according to the invention to determine whether a current is or is not flowing through the first freewheeling diode 2-1. This information can be provided as digital information, for example in the form of a yes/no signal. Furthermore, other options for monitoring the current through the first freewheeling diode 2-1 are, however, also possible. For example, a value of the electrical current or a variable corresponding to the electrical current flowing through the freewheeling diode 2-1 can be ascertained and provided as an analog or digital signal.

In a further step 121, a second electrical current through the second freewheeling diode 2-2 is furthermore monitored. The current through the second freewheeling diode 2-2 is monitored in the same manner as the first electrical current through the first freewheeling diode 2-1.

If the electric machine 5 is to be changed to a safe operating state in the form of a freewheeling mode, a request for a change in the operating state of the electric machine 5 to the freewheeling mode can then be received in step 140. This request for the change in the operating state of the electric machine 5 to the freewheeling mode can, for example, take place by means of the actuating device 4 described in connection with FIG. 2. In this case, the results of the monitoring of the first electrical current through the first freewheeling diode 2-1 and of the monitoring of the second electrical current through the second freewheeling diode 2-2 can also be provided to the actuating device 4. The actuating device 4 then carries out the procedural steps described in this embodiment and/or in the succeeding embodiments.

The switching elements 1-1 to 1-3 are then all opened in order to adjust to the requested freewheeling mode at the electric machine 5. To this end, the switching elements 1-1 to 1-3 are then preferably opened if currently now no electrical current is flowing through the corresponding switching elements 1-1 to 1-3 or respectively if the current through the corresponding switching elements 1-1 to 1-3 is only relatively low. Because, according to the invention, a monitoring of an electrical current does not take place in the current path of the third switching element 1-3 between the third phase connection 5-3 of the electric machine 5 and the node K, the current flow through the third switching element 1-3 or respectively through the third freewheeling diode 2-3 disposed in parallel with the third switching element 1-3 is determined on the basis of a logical linking of the monitored electrical currents through the first freewheeling diode 1-2 and the second freewheeling diode 2-2. The third switching element 1-3 is then opened as a function of the monitored first electrical current through the first freewheeling diode 2-1 and the monitored second electrical current through the second freewheeling diode 2-2 in step 160.

In one embodiment, the third switching element 1-3 can, for example, then be opened in step 160 if a request for changing the operating state of the electric machine 5 to the freewheeling mode has been received and no current through the first freewheeling diode 2-1 is detected in the steps 120 for monitoring the first electrical current through the first freewheeling diode 2-1 and, at the same time in step 121 for monitoring the second electrical current through the second freewheeling diode 2-2, likewise no electrical current is detected through the second freewheeling diode 2-2. In this case, the phase shift of the electrical currents in the individual phases of the electrical machine 5 suggests that an electrical current has to be flowing through the third freewheeling diode 2-3 at this point in time and therefore no electrical current or only a very low electrical current is flowing through the third switching element 1-3, which is disposed in parallel with the third freewheeling diode 2-3, at this point in time. Hence, the third switching element 1-3 can be opened at this point in time without significant excess voltages being expected as a result at the third switching element 1-3.

The first switching element 1-1 can subsequently be opened in step 161 after the third switching element 1-3 is opened and an electrical current through the first freewheeling diode 2-1 is detected in step 120 for monitoring the first electrical current through the first freewheeling diode 2-1. Furthermore, the second switching element 1-2 can be opened in step 162 if the third switching element 1-3 has previously been opened in step 160 and an electrical current through the second freewheeling diode 2-2 is detected in step 121 for monitoring the second electrical current through the second freewheeling diode 2-2. If electrical currents are flowing in each case through the first or respectively second freewheeling diode 2-1 and 2-2, the corresponding switching elements 1-1 or respectively 1-2 disposed in parallel with said freewheeling diodes can be opened at these points in time without a significant excess voltage occurring across the opened switching elements 1-1 or respectively 1-2.

In this way, upon receiving a request for changing the operating of the electric machine 5 to the freewheeling mode, the third switching element 1-3 is then initially opened on the basis of a logical linking of the monitored currents through the first freewheeling diode 2-1 and the second freewheeling diode 2-2 if no electrical current is to be expected through the third switching element 1-3. After that, the first switching element 1-1 and the second switching element 1-2 are then subsequently opened if no electrical current is to be expected through the corresponding switching elements 1-1 and 1-2.

In a further embodiment, the first switching element 1-1 can, for example, then be opened if a request for changing the operating state of the electric machine 5 to the freewheeling mode has been received and an electrical current through the first freewheeling diode is detected in step 120 for monitoring the first electrical current through the first freewheeling diode 2-1. The second switching element 1-2 can furthermore then be opened if a request for changing the operating state of the electric machine 5 to the freewheeling mode has been received and a current through the second freewheeling diode 2-2 is detected in step 121 for monitoring the second electrical current through said second freewheeling diode 2-2. As a result, the first switching element 1-1 and the second switching element 1-2 are initially opened if no or only very low electrical currents are to be expected through the corresponding switching elements 1-1 and 1-2.

In step 160 for opening the third switching element 1-3, the third switching element can then subsequently be opened if the request for changing the operating state of the electric machine 5 to the freewheeling mode has been received and the first switching element 1-1 as well as the second switching element 1-2 has already been open for a predetermined length of time. Thus, the third switching element 1-3 is opened a predetermined length of time after the two switching elements 1-1 and 1-2 have been opened. The predetermined length of time, after which the third switching element 1-3 is then also opened, results from the frequency of the phase currents in the phases of the electric machine 5 during the previous operating state. This frequency of the phase currents can, for example, be known from a previous actuation of the electric machine 5. It is also alternatively possible to determine the frequency of the phase currents from the rotational speed of the electric machine 5. To this end, the electric machine 5 can, for example, be coupled to a corresponding sensor for determining the rotational frequency of the electric machine. Further options for determining the rotational frequency of the electric machine 5 or respectively the frequency of the phase currents through the switching elements 1-1 to 1-3 are furthermore likewise possible. For example, the rotational frequency can also be derived from the monitored phase currents through the first freewheeling diode 2-1 and/or the second freewheeling diode 2-2.

In an alternative embodiment, the switching element 1-1 can then be opened if a request for changing the operating state of the electric machine 5 to the freewheeling mode has been received and if it is detected in step 120 for monitoring the first electrical current through the first freewheeling diode 2-1 that the electrical current through the first freewheeling diode 2-1 has just stopped flowing. This event can, for example, be detected as a result of the current through the first freewheeling diode 2-1 being continually monitored and the point in time being subsequently determined at which a previously flowing electrical current stopped flowing through the first freewheeling diode 2-1 or as a result of current through the first freewheeling diode 2-1 dropping at this point in time below a predefined limit value, in particular a very low limit value of approximately zero.

The second switching element is then analogously opened if a request for changing the operating state of the electric machine 5 to the freewheeling mode has been received and step 121 for monitoring the second electrical current through the second freewheeling diode 2-2 detects that the current has just stopped flowing through the second freewheeling diode 2-2. This point in time can be determined analogously to the previously described embodiment by virtue of the fact that the phase current is, for example, continuously monitored and the point in time is detected at which the phase current through the second freewheeling diode drops below a predefined, preferably very low, limit value.

Subsequently in step 160 for opening the third switching element 1-3, the switching element 1-3 is then opened if a request for changing the operating state of the electric machine 5 to the freewheeling mode has been received and the first switching element 1-1 as well as the second switching element 1-2 is open. This point in time is then particularly provided if the two previously described switching elements, i.e. the first switching element 1-1 and the second switching element 1-2, are open.

If the direction of rotation of the electric machine 5 is furthermore known, further embodiments are additionally possible. To this end, the direction of rotation of the electric machine 5 can, for example, be determined. Alternatively, the order of the individual phases can also be determined, in which the individual phases reach their maximum value.

To this end, the direction of rotation of the electric machine 5 can, for example, be determined in step 130. It is subsequently determined on the basis of the direction of rotation which of the switching elements is to be considered the first switching element 1-1 and which switching element is to be considered the second switching element 1-2. The third switching element 1-3 is in any case the switching element at which a monitoring of the current through the freewheeling diode 3-2, which is disposed in parallel, does not occur.

In step 160 for opening the third switching element 1-3, the third switching element 1-3 can then be opened if a request for changing the operating state of the electric machine 5 to the freewheeling mode has been received and step 120 for monitoring the electric current through the first freewheeling diode 2-1 detects that the current has just stopped flowing through the first freewheeling diode 2-1, i.e. drops below a predetermined limit value as previously described.

The first switching element 1-1 can then be opened if the request for changing the operating state of the electric machine 5 to the freewheeling mode has been received and step 121 for monitoring the second electrical current through the second freewheeling diode 2-2 detects that the current through the second freewheeling diode 2-2 drops below a predetermined limit value, i.e. has just stopped flowing.

The second switching element 1-2 can furthermore be opened if the request for changing the operating state of the electric machine 5 to the freewheeling mode has been received and the first switching element 1-1 as well as the third switching element 1-3 is open.

In the case of a known relationship of the electrical phases of the electric machine 5, the second switching element 1-2 and simultaneously also the third switching element 1-3 can furthermore be opened on the basis of the previously described determination of the direction of rotation if the request for changing the operating state of the electric machine 5 to the freewheeling mode has been received and the electrical current has just stopped flowing through the second freewheeling diode 2-2, i.e. drops below a predetermined limit value.

The first switching element 1-1 can then subsequently be opened if the request for changing the operating state of the electric machine 5 to the freewheeling mode has been received and step 120 for monitoring the electrical current through the first freewheeling diode 2-1 detects that an electrical current is flowing through the first freewheeling diode 2-1.

In all of the exemplary embodiments, which require the direction of rotation or respectively the order of the phase currents to be determined, this direction of rotation or order of the phase currents can be determined using the monitored currents in the first freewheeling diode 2-1 and the second freewheeling diode 2-2. On the basis of the temporal sequence in which a current flow is detected through the first freewheeling diode 2-1 or the second freewheeling diode 2-2, the relationship of the phase currents or the direction of rotation of the electric machine 5 can be determined in a simple manner.

In the previously described manner, an optimal point in time, at which the respective switching element 1-1 to 1-3 can be opened without a significant excess voltage thereby occurring across the corresponding switching element 1-1 to 1-3, can be ascertained at relatively large amplitudes of the phase currents through the switching elements 1-1 to 1-3 in each case by determining only two currents through the first freewheeling diode 2-1 or respectively the second freewheeling diode 2-2 for all three switching elements 1-1 to 1-3. In the case of relatively low rotational speeds below a predetermined rotational frequency, only relatively low currents flow in contrast in the individual phases of the electric machine 5 and therefore through the switching elements 1-1 to 1-3. At rotational speeds of the electric machine 5 below this predetermined rotational frequency, the switching elements 1-1 to 1-3 can therefore be opened at any given point in time without a significant excess voltage occurring in the process.

According to one embodiment, which can be combined with each of the previously described embodiments, the rotational speed of the electric machine 5 can therefore be initially determined, and the switching elements 1-1 to 1-3 can be opened at any given point in time independently of the previously described evaluations of the currents through the freewheeling diodes 2-1 or 2-1. For example, all of the switching elements 1-1 to 1-3 can be opened at the same time and immediately upon receiving a request for the change to the freewheeling mode.

In summary, the present invention relates to a device and a method for changing the operating state of an electric machine to the freewheeling mode, in which significant excess voltages can be prevented. In the freewheeling mode, the individual phase connections of an electric machine are disconnected electrically from one another in order to change the electric machine into a safe operating state. According to the invention, only some of the phase currents of the electric machine are evaluated. On the basis of the evaluated phase currents, suitable points in time for the disconnection of all the phase connections are determined, that is to say even for the phases in which no evaluation of the phase currents takes place.

The invention claimed is:

1. A method (100) for changing an operating state of an electric machine (5) having at least three phase connections (5-1, 5-2, 5-3) to a freewheeling mode, the method comprising:
providing (110) a first switching element (1-1), which includes a first freewheeling diode (2-1), between a first phase connection (5-1) of the electric machine (5) and a node (K);
providing (111) a second switching element (1-2), which includes a second freewheeling diode (2-2), between a second phase connection (5-2) of the electric machine (5) and the node (K);
providing (112) a third switching element (1-3), which includes a third freewheeling diode (2-3), between a third phase connection (5-3) of the electric machine (5) and the node (K);
monitoring (120) a first electrical current through the first freewheeling diode (2-1);
monitoring (121) a second electrical current through the second freewheeling diode (2-2);
receiving (140) a request for changing the operating state of the electric machine (5) to a freewheeling mode; and
opening (160) the third switching element (1-3) as a function of the monitored first electrical current through the first freewheeling diode (2-1) and the monitored second electrical current through the second freewheeling diode (2-2) when a request for changing the operating state of the electric machine (5) to the freewheeling mode has been received;
determining a direction of rotation of the electric machine (5) and associating the first switching element (1-1) and the second switching element (1-2) with the respective phase connections of the electric machine (5) as a function of the determined direction of rotation;
opening the second switching element (1-2) and the third switching element (1-3) when a request for changing the operating state of the electric machine (5) to the freewheeling mode has been received and the step (121) for monitoring a second electrical current through the second freewheeling diode (2-2) detects that the current through the second freewheeling diode (2-2) drops below a predetermined limit value;
opening the first switching element (1-1) when a request for changing the operating state of the electric machine (5) to the freewheeling mode has been received and the step (120) for monitoring a first electrical current through the first freewheeling diode (1-1) detects that the current is flowing through the first freewheeling diode (1-1).

2. The method (100) according to claim 1, wherein the step (160) for opening the third switching element (1-3) opens the third switching element (1-3) when a request for changing the operating state to the freewheeling mode has been received and no current is detected through the first freewheeling diode (2-1) and the second freewheeling diode (2-2) in the steps for monitoring (120) the first electrical current through the first freewheeling diode (2-1) and for monitoring (121) the second electrical current through the second freewheeling diode (2-1).

3. The method (100) according to claim 2, further comprising:
opening (161) the first switching element (1-1) when the third switching element (1-3) is open and the step (120) for monitoring the first electrical current through the first freewheeling diode (2-1) detects an electrical current through the first freewheeling diode (2-1); and
opening (162) the second switching element (1-2) when the third switching element (1-3) is open and the step (121) for monitoring the second electrical current through the second freewheeling diode (2-2) detects an electrical current through the second freewheeling diode (2-2).

4. The method (100) according to claim 1, further comprising:
opening the first switching element (1-1) when a request for changing the operating state of the electric machine (5) to the freewheeling mode has been received and the step (120) for monitoring a first electrical current through the first freewheeling diode (2-1) detects a current through the first freewheeling diode (2-1);
opening the second switching element (1-2) when a request for changing the operating state of the electric machine (5) to the freewheeling mode has been received and the step (121) for monitoring a second electrical current through the second freewheeling diode (2-2) detects a current through the second freewheeling diode (2-2);

wherein the step (160) for opening the third switching element (1-3) opens the third switching element (1-3) when a request for changing the operating state of the electric machine (5) to the freewheeling mode has been received and the first switching element (1-1) and the second switching element (1-2) are open for a predetermined length of time.

5. The method (100) according to claim 1, further comprising:
opening the first switching element (1-1) when a request for changing the operating state of the electric machine (5) to the freewheeling mode has been received and the step (120) for monitoring the first electrical current through the first freewheeling diode (2-1) detects that the current through the first freewheeling diode (2-1) drops below a predetermined limit value; and
opening the second switching element (1-2) when a request for changing the operating state of the electric machine (5) to the freewheeling mode has been received and the step (121) for monitoring the second electrical current through the second freewheeling diode (2-2) detects that the current through the second freewheeling diode (2-2) drops below the predetermined limit value;
wherein the step (160) for opening the third switching element (1-3) opens the third switching element (1-3) when a request for changing the operating state of the electric machine (5) to the freewheeling mode has been received and the first switching element (1-1) and the second switching element (1-2) are open.

6. The method (100) according to claim 1, further comprising determining(130) a direction of rotation of the electric machine (5) and associating the first switching element (1-1) and the second switching element (1-2) with the respective phase connections of the electric machine (5) as a function of the determined direction of rotation;
wherein the step (160) for opening the third switching element (1-3) opens the third switching element (1-3) when a request for changing the operational state of the electric machine (5) to the freewheeling mode has been received and the step (120) for monitoring a first electrical current through the first freewheeling diode (2-1) detects that the current through first freewheeling diode (2-1) drops below a predetermined limit value;
opening the first switching element (1-1) when a request for changing the operating state of the electric machine (5) to the freewheeling mode has been received and the step (121) for monitoring a second electrical current through the second freewheeling diode (2-2) detects that the current through the second freewheeling diode (2-2) drops below a predetermined limit value; and
opening the second switching element (1-2) when a request for changing the operating state of the electric machine (5) to the freewheeling mode has been received and the first switching element (1-1) as well as the third switching element (1-3) is open.

7. The method (100) according to claim 6, wherein the step (130) for determining the direction of rotation of the electric machine (5) detects the direction of rotation using the monitored first electrical current through the first freewheeling diode (1-1) and the monitored second electrical current through the second freewheeling diode (1-2).

8. The method (100) according to claim 1, further comprising determining a rotational speed of the electric machine (5);
wherein the first switching element (1-1), the second switching element (1-2) and the third switching element (1-3) are opened at the same time if the rotational speed of the electric machine (5) undershoots a predetermined threshold value.

9. The method according to claim 1, wherein the step (120) for monitoring the first electrical current through the first freewheeling diode (2-1) determines whether a current is flowing or is not flowing through the first freewheeling diode (2-1), and wherein the step (121) for monitoring the second electrical current through the second freewheeling diode (2-2) determines whether a current is flowing or is not flowing through the second freewheeling diode (2-2).

10. A device for changing the operating state of an electric machine (5), which comprises at least three phase connections, to a freewheeling mode, said device comprising:
a first switching element (1-1), which is configured to electrically connect a first phase connection (5-1) of the electric machine (5) to a node (K), the first switching element (1-1) comprising a first freewheeling diode (2-1);
a second switching element (1-2), which is configured to electrically connect a second phase connection (5-2) of the electric machine (5) to the node (K), the second switching element (1-2) comprising a second freewheeling diode (2-2);
a third switching element (1-3) which is configured to electrically connect a third phase connection (5-3) of the electric machine (5) to the node (K), the third switching element (1-3) comprising a third freewheeling diode (2-3);
a first current detector (3-1) which is configured to detect an electrical current through the first freewheeling diode (2-1);
a second current detector (3-2) which is configured to detect an electrical current through the second freewheeling diode (2-2); and
an actuating device (4), which is configured to receive a request (A) for changing the operating state of the electric machine (5) to the freewheeling mode and to emit a control signal for opening the third switching element (1-3), the control signal for opening the third switching element (1-3) being emitted as a function of the electrical current detected by the first current detector (3-1) and the electrical current detected by the second current detector (3-2), to determine a direction of rotation of the electric machine (5) and associating the first switching element (1-1) and the second switching element (1-2) with the respective phase connections of the electric machine (5) as a function of the determined direction of rotation, to open the second switching element (1-2) and the third switching element (1-3) when a request for changing the operating state of the electric machine (5) to the freewheeling mode has been received and the step (121) for monitoring a second electrical current through the second freewheeling diode (2-2) detects that the current through the second freewheeling diode (2-2) drops below a predetermined limit value, and to open the first switching element (1-1) when a request for changing the operating state of the electric machine (5) to the freewheeling mode has been received and the step (120) for monitoring a first electrical current through the first freewheeling diode (1-1) detects that the current is flowing through the first freewheeling diode (1-1).

11. A current converter comprising a device for changing the operating state of an electric machine (5) according to claim 10.

12. An electrically driven motor vehicle comprising a device for changing the operating state of an electric machine (5) according to claim 10.

* * * * *